3,488,769
STIRRER
Douglass R. Falkenberg, 20997 Westlake Road,
Rocky River, Ohio 44116
Filed Mar. 27, 1968, Ser. No. 716,372
Int. Cl. B01f *13/00*
U.S. Cl. 416—71                                    17 Claims

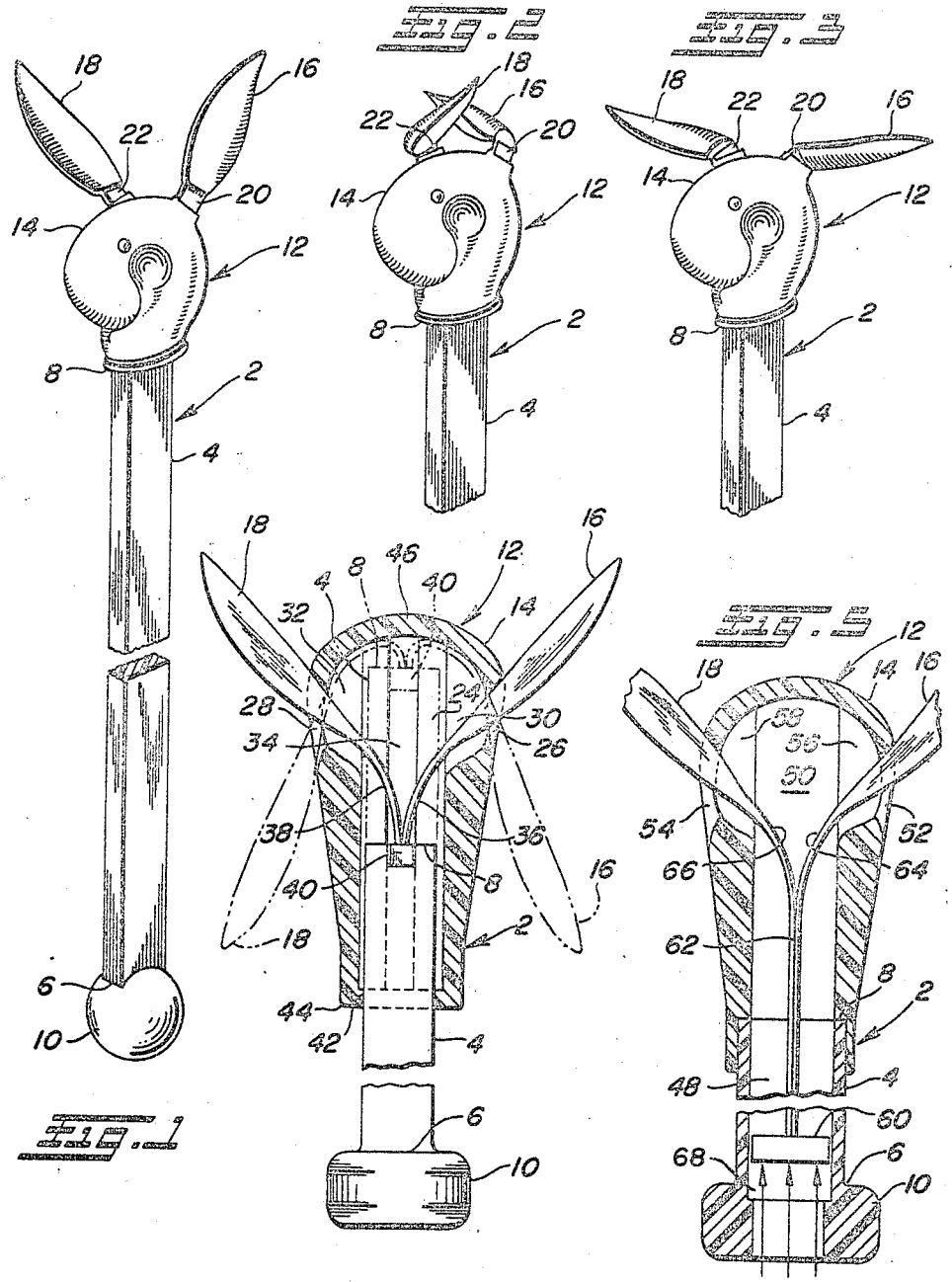

ABSTRACT OF THE DISCLOSURE

A plastic stirrer for mixing liquids, including an elongated rod with a decorative figure at one end. The visual appearance of the figure is changeable by altering the position of at least one of the parts comprising the figure.

BACKGROUND OF INVENTION

The invention will be described in relation to stirrers for mixing liquids, e.g., mixed drinks, or "swizzle sticks" as they are commonly referred to. These sticks are normally made of plastic and, generally, have an ornamental design or figure at one end for decorative purposes. It has been found that protruding portions of these figures are highly susceptible to breaking. These broken portions can fall accidentally into a drink and cause considerable discomfort to a person when swallowed.

An object of this invention is to solve this problem. A basic embodiment of the invention utilizes a flexible plastic coupling or hinge strap for connecting the comparatively more rigid protruding portions to the figure. Thus, instead of breaking from the figure when struck, the protruding portions will bend or flex. In addition, the flexible coupling gives the stick an added playful dimension, since the appearance or expression of the figure can be changed by varying the position of the parts relative to each other.

The following description of the invention will be better understood by referring to the annexed drawing, wherein:

FIG. 1 is a perspective view of a swizzle stick including a figure head in the shape of an animal head, and employing an embodiment of the invention;

FIGS. 2 and 3 are perspective views of the animal head showing different positions to which the ears of the head can be moved to change the appearance of the figurehead;

FIG. 4 is a cross sectional view of another embodiment of the invention, utilizing the same shaped animal head, but employing a different mechanism for causing movement of the ears; and FIG. 5 is a cross sectional view of another embodiment utilizing the same shaped animal head, but employing still a different mechanism for causing movement of the ears.

Referring more particularly to the drawing, there is shown a stirrer, or swizzle stick, generally indicated at 2. The swizzle stick is molded from plastic, e.g., polypropylene, and comprises a rod 4 with opposing ends 6 and 8. A ball portion 10 is disposed at one of the ends 6 of the rod 4.

An ornamental figurehead 12 is disposed at the opposing rod end 8. In this particular embodiment, the figurehead or figure 12 is shaped to resemble a rabbit head 14 with outstanding ears 16 and 18. The protruding ears 16 and 18 are normally delicately formed and attached to the rabbit head 14, and consequently susceptible to breaking from the swizzle stick 2.

THE INVENTION

Referring more particularly to FIGS. 1–3 of the drawing, flexible plastic couplings or hinge straps 20 and 22 are provided to attach the comparatively more rigid ears 16 and 18 to the rabbit head 14. Thus, instead of breaking from the rabbit head 14 when struck or hit, the ears 16 and 18 will bend or flex. The hinge strap effect is achieved during molding by reducing the amount of plastic material intermediate the ears 16 and 18, and rabbit head 14.

The hinge straps 20 and 22 each have a rectangular cross section taken in a plane normal to the plane of the strap and longitudinal axis of the strap. Each strap resembles a thin flexible band wherein the width of the strap is much greater than the thickness of the strap. In the embodiment shown, the hinge straps 20 and 22 have a thickness of from about $10/32$ inch to about $11/32$ inch. Because of the particular rectangular cross section of the straps 20 and 22, the ears 16 and 18 will be more apt to move in a single plane. The thickness of the hinge straps 20 and 22 is such that the ears 16 and 18 can be distorted in these single planes to a plurality of positions relative to each other and the rabbit head 14; rather than resiliently springing back from such positions to their normally upright positions.

It should be appreciated that it is far more difficult to distort the ears 16 and 18 by twisting than distorting them in their individual planes. The normal movement of the ears 16 and 18 in their individual planes, is towards and away from each other. Thus, the tips 24 and 26 of the ears 16 and 18, can be crossed or moved further apart (FIGS. 2 and 3). In addition to preventing breakage of the ears 16 and 18 from the rabbit head 14, the hinge straps 20 and 22 permit changing the appearance of the ornamental rabbit head by distorting the rabbit ears 16 and 18 to different positions relative to the head 14.

Referring more particularly to FIG. 4 of the drawing, the rabbit head 14 is moved relative to the rod 4 to cause movement of the ears 16 and 18. This is accomplished by securing the ears 16 and 18 to the rod 4, and slidably mounting the rabbit head 14 on the rod 4 to engage and distort the ears 16 and 18.

The rabbit head 14 is provided with an axial recess 24 for slidably receiving the adjacent rod end 8. The rabbit head 14 is also provided with openings 26 and 28 for receiving the ears 16 and 18. The ear openings 26 and 28 of the rabbit 14, communicate with the axial recess 24 through laterally extending passageways 30 and 32. A pair of oppositely disposed guideways, e.g., guideway 34, are longitudinally disposed in the axial recess 20.

The ears 16 and 18 project from the rabbit head 14 through the openings 22 and 24. A pair of flexible plastic couplings or hinge straps 36 and 38 are used to secure or couple the ears 16 and 18 to the rod end 8. The hinge straps 36 and 38 extend from the rod end 8 through the lateral passageways 30 and 32 for attachment to the ears 16 and 18.

A pair of oppositely disposed tabs or guides, e.g. guide 40, project from the rod end 8 into the guideways, e.g. guideway 34, and slide therealong.

A collar 42 is disposed at the lower end 44 of the rabbit head 14 in restricting relation to the recess 24. The collar 42 acts as an abutment to engage the guides, e.g. guide 40, and prevent withdrawl of the rod 4 from the axial recess 24. In this manner the head 14 and rod 4 are slidably locked together.

The ears 16 and 18 move in response to relative movement between the animal head 14 and rod 4. This is accomplished by depressing the head 14 towards the opposing rod end 6 and ball 10. When the animal head 14 is fully depressed such that the rod end 8 lies adjacent the upper portion 46 of the head 14, the ears 16 and 18 will be in a downwardly directed position rather than in their normally upright position (see dotted position of rod 4 and corresponding downward position of ears 16 and 18 in FIG. 4).

Although the ears 16 and 18 are shown extending freely through the openings 26 and 28 of the animal head 14, it should be appreciated that similar movement, i.e. upwardly directed to downwardly directed, or wiggling of the ears can be achieved by pivotally mounting the ears within their respective openings. The pivots are placed intermediate the ends of the ears, and the ends of the ears within the head then secured to the rod by similar hinge straps.

Referring more particularly to FIG. 5 of the drawing, the rabbit head 14 is fixedly secured to the rod end 8 and not mounted for movement relative to the rod 4. The rod 4 is hollow, having an axial recess 48 in aligned relation with a recess 50 formed in the rabbit head 14. The rabbit head 14 similarly has openings 52 and 54 for receiving the rabbit ears 16 and 18. The ear openings 52 and 54 similarly communicate with the head recess 50 through lateral passageways 56 and 58.

A float 60, responsive to liquid under pressure, is mounted for reciprocating movement in the coaxial recesses 48 and 50 of the rod 4 and head 14, respectively. The ears 16 and 18 are attached to the float 60 by means of a flexible plastic coupling or hinge strap 62 with bifurcated ends 64 and 66. The float 60 may be in the form of a circular disc for mating sliding coaction within cylindrical recesses 48 and 50 of the rod 4 and head 14. An annular shoulder or abutment 68 is provided at the rod end 6 for engaging the float 60 to keep it within the rod 4.

When the stirrer or swizzle stick 2 is placed in a glass containing liquid, the liquid under pressure moves into the rod recess 48 for engaging and exerting pressure, or force against the float 60 (note arrows denoting upward forces). The forces move the float 60 along the rod recess 48 towards the rabbit head 14, thereby causing movement of the ears 16 and 18 from their normally upright position to a downwardly directed position similar to that shown in dotted line in FIG. 4. When the swizzle stick 2 is taken from the liquid, the pressure or force against the float 60, is naturally removed. The float 60 then moves back towards the rod end 62 and its normal restive position. The ears 16 and 18 also return to their normally upright position relative to the rabbit head 14. In all cases, distortion or movement of the hinge straps causes movement of the ears 16 and 18 relative to the head 14.

Thus, there has been provided a new and novel mechanism for securing together rigid parts of an ornamental figurehead, such that breakage of any of the parts from the figurehead is substantially eliminated. Further, any of the parts can be moved to a plurality of distorted positions to change the visual appearance or expression of the figurehead.

I claim:
1. A stirrer for mixing liquids, comprising in combination:
    (a) an ornamental figure having at least one protruding portion;
    (b) means for positioning said portion relative to said figure to convey a predetermined visual expression of said figure;
    (c) means coacting with said portion for causing relative movement between said portion and figure to convey a visual expression of said figure different from said predetermined visual expression.

2. The stirrer of claim 1, wherein said positioning means includes a hinge strap in connecting relation between said portion and figure.

3. The stirrer of claim 2, wherein said movement causing means includes means coacting with said strap for causing said strap to flex or bend.

4. The stirrer of claim 3, wherein said hinge strap has a rectangular cross section and the width of said strap is substantially greater than the thickness of said strap.

5. The stirrer of claim 4, wherein the hinge strap is composed of plastic.

6. The stirrer of claim 1, which includes a rod extending from said figure, and said positioning means are in connecting relation with said portion and rod.

7. The stirrer of claim 6, wherein said means for causing relative movement between said portion and figure includes, means for mounting said figure on said rod to move said positioning means causing relative movement between said portion and figure.

8. The stirrer of claim 7, wherein said figure mounting means includes means for mounting the figure for reciprocating movement along the longitudinal axis of said rod.

9. The stirrer of claim 8, wherein said positioning means includes a flexible hinge strap.

10. The stirrer of claim 1, which includes a hollow rod extending from the figure, and said means for causing relative movement between said portion and figure includes:
    (d) means disposed within said rod and movable in response to liquid under pressure;
    (e) means for mounting said liquid pressure responsive means for movement along the longitudinal axis of said rod.

11. The stirrer of claim 10, wherein said positioning means includes:
    (f) means for coupling said portion to said pressure responsive means (d), such that movement of means (d) causes movement of said portion relative to said figure.

12. A stirrer for mixing liquids comprising in combination:
    (a) a plastic rod;
    (b) an ornamental plastic figure disposed at one end of the rod, said figure resembling a head with a pair of ears protruding from the head; and
    (c) a plastic hinge strap secured to each ear for positioning the ears relative to the head to convey a predetermined visual expression of said figure, each hinge strap having a rectangular cross section and being flexible, whereby the ears can be moved to a plurality of positions relative to the head, to change the visual expression of said figure.

13. The stirrer of claim 12, which includes:
    (d) means for flexing said straps.

14. The stirrer of claim 13, wherein said strap flexing means includes means for securing said straps to said rod and means for movably mounting said head on said rod to engage and flex said straps.

15. The stirrer of claim 14, wherein the movable mounting means includes means for mounting the head for reciprocating movement along the longitudinal axis of the rod.

16. The stirrer of claim 13, wherein the strap flexing means includes means movable in response to liquid under pressure.

17. The stirrer of claim 16, wherein the rod is hollow and the strap flexing means is a float disposed within the rod.

References Cited

UNITED STATES PATENTS

| | | | |
|---|---|---|---|
| 2,462,991 | 3/1949 | Palinkas | 259—144 |
| 2,793,842 | 5/1957 | Bacon | 259—144 |

FOREIGN PATENTS

| | | |
|---|---|---|
| 692,203 | 8/1964 | Canada. |
| 1,016,871 | 1/1966 | Great Britain. |

WILLIAM I. PRICE, Primary Examiner